(12) United States Patent
Hatzikakidis

(10) Patent No.: US 9,527,361 B2
(45) Date of Patent: Dec. 27, 2016

(54) CHAMBER CLUSTER FOR A CO-AXIAL DAMPER UNIT IN A SUSPENSION MODULE

(71) Applicant: Dimitrios Hatzikakidis, P. Faliro Attikis (GR)

(72) Inventor: Dimitrios Hatzikakidis, P. Faliro Attikis (GR)

(*) Notice: Subject to any disclaimer, the term of this patent is extended or adjusted under 35 U.S.C. 154(b) by 0 days.

(21) Appl. No.: 14/369,429

(22) PCT Filed: Dec. 28, 2012

(86) PCT No.: PCT/GR2012/000054
§ 371 (c)(1),
(2) Date: Jun. 27, 2014

(87) PCT Pub. No.: WO2013/098566
PCT Pub. Date: Jul. 4, 2013

(65) Prior Publication Data
US 2014/0361474 A1  Dec. 11, 2014

(30) Foreign Application Priority Data

Dec. 29, 2011 (GR) .............................. 20110100739

(51) Int. Cl.
*F16F 9/14* (2006.01)
*B60G 15/06* (2006.01)
(Continued)

(52) U.S. Cl.
CPC ........... *B60G 15/06* (2013.01); *B60G 21/0558* (2013.01); *F16F 9/12* (2013.01); *F16F 9/14* (2013.01); *F16F 9/145* (2013.01); *B60G 2202/22* (2013.01)

(58) Field of Classification Search
CPC ................ F16F 9/145; F16F 9/14; F16F 9/12; F16F 9/36; F16F 9/369; F16F 9/532; F16F 9/535; B60G 2206/41; B60G 2202/22; B62K 21/08; E05F 3/14
See application file for complete search history.

(56) References Cited

U.S. PATENT DOCUMENTS 1,171,169 A * 2/1916 Carter ............................ 188/307
1,435,053 A * 11/1922 Derihon ........................ 188/306
(Continued)

FOREIGN PATENT DOCUMENTS

EP      1 710 464 A1   10/2006
JP      H03 227713     10/1991
(Continued)

OTHER PUBLICATIONS

International Search Report dated May 14, 2013 issued in corresponding International patent application No. PCT/GR2012/000054.

*Primary Examiner* — Bradley King
*Assistant Examiner* — Stephen Bowes
(74) *Attorney, Agent, or Firm* — John P. White; Gary J. Gershik; Cooper & Dunham LLP

(57) ABSTRACT

A chamber cluster (1) for a co-axial damper unit, used in a suspension module, that is driven by the motion of a torsion bar (2), that transmits the rotational motion through gears (3), (4), (5) to a wing (6), enclosed within. The rotary motion of the wing (6), in a viscous medium in a volumous space (19), sealed by seals (10), (11), achieves damping by enclosing the wing (6), inside a W-shaped flexible component (7), and by the use of a two-phase viscous fluid, that is subject to a viscosity variation, by means of electromagnetic control through a device (15). Several chamber cluster (1) units connected via a bulkhead (20), create an assembly forming the co-axial damper unit, thus a cluster (1) of cluster units (e.g., 3, 4, 5, 6), for use in a suspension module.

8 Claims, 4 Drawing Sheets

(51) Int. Cl.
   *F16F 9/12*      (2006.01)
   *B60G 21/055*    (2006.01)

(56) References Cited

U.S. PATENT DOCUMENTS

| | | | | |
|---|---|---|---|---|
| 1,778,905 | A * | 10/1930 | Mitchell | 267/223 |
| 1,799,662 | A * | 4/1931 | Weiss | 188/307 |
| 2,314,493 | A * | 3/1943 | Guy | 188/306 |
| 3,861,503 | A * | 1/1975 | Nash | 188/276 |
| 4,497,393 | A * | 2/1985 | Brems | 188/322.5 |
| 5,449,054 | A * | 9/1995 | Wiese et al. | 188/296 |
| 6,341,677 | B1 | 1/2002 | Oliver et al. | |
| 6,439,356 | B1 * | 8/2002 | Butera et al. | 188/267.2 |
| 2004/0007432 | A1 * | 1/2004 | Biasiotto et al. | 188/306 |

FOREIGN PATENT DOCUMENTS

| | | |
|---|---|---|
| JP | H03 227714 | 10/1991 |
| WO | WO 2011/000555 A2 | 1/2011 |

* cited by examiner

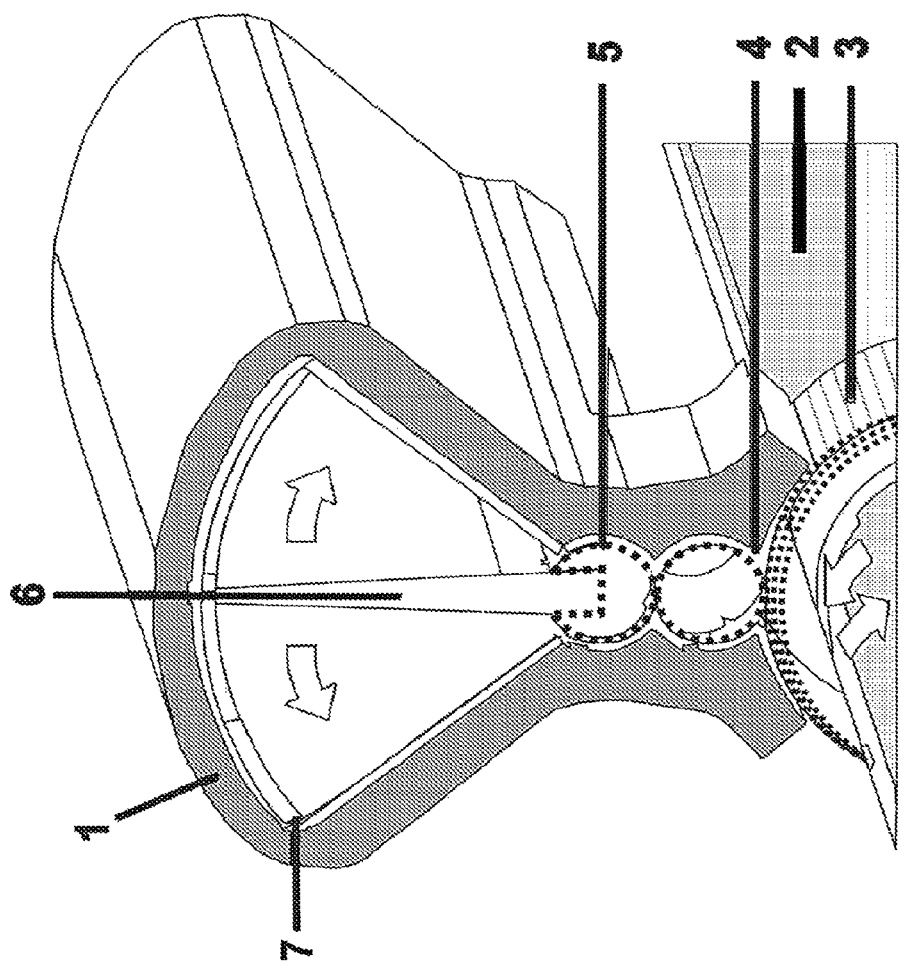

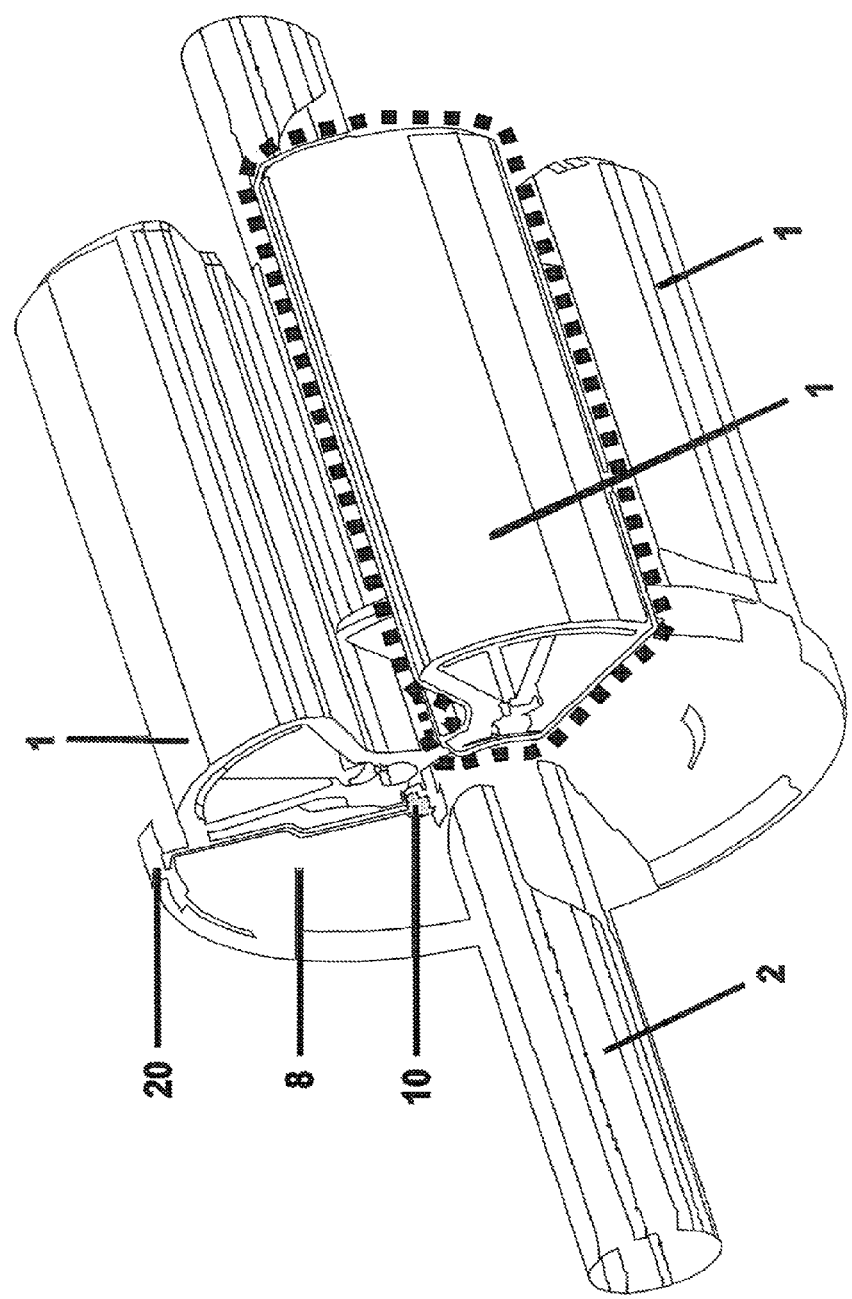

CHAMBER CLUSTER FOR A CO-AXIAL DAMPER UNIT IN A SUSPENSION MODULE

CROSS REFERENCE TO RELATED APPLICATIONS

The present application is a 35 U.S.C. §371 National Phase conversion of PCT/GR2012/000054, filed Dec. 28, 2012, which claims benefit of Greek Application No. 20110100739, filed Dec. 29, 2011, the disclosure of which is incorporated herein by reference. The PCT International Application was published in the English language.

TECHNICAL FIELD OF THE INVENTION

The present invention relates to a chamber cluster for a co-axial damper unit, driven by a torsion bar, in a suspension module of a car.

The existing damping arrays, in automotive applications, range from anti-roll bar uses, as in Pask (1999), to an entire suspension module arrangement, in Hatzikakidis (2011).

BACKGROUND OF THE INVENTION

These prior art cases include: The rotary actuator for active roll control by M. Pask (1999), the rotary damper by M. Oliver (2002), the stabilizer bar with variable torsional stiffness by M. Gradu (2004), the suspension arrangement by S.Zetterstrom (2008), and the rotary damper arrangement for torsion bars for vehicles, by D.Hatzikakidis (2011).

SUMMARY OF THE INVENTION

The object of the present invention is the integration of a chamber cluster into an assembly that makes up a co-axial damper unit, and then, in turn, integrated into a cluster (corresponding to a chamber cluster) of cluster units (corresponding to, e.g., parts 3, 4, 5, 6), and thus integrated into a suspension module of a vehicle. The resulting suspension module is made up of many independent chambers, utilizing the primary motion of the torsion bar, (which acts as the "spring" of the suspension module). The assembly of the co-axial damper unit, comprises several sets of gear drives, incorporating several idle gears to drive the corresponding damping wing surfaces. Furthermore, each chamber cluster houses a W-shaped flexible component, enclosing each damping wing. The resulting co-axial damper unit, made up of an assembly of several chamber clusters, can provide variable damping characteristics, by varying the pressure of the fluid and by varying the viscous characteristics of the fluid, inside the chambers, by electromagnetic and magnetic means.

A "single chamber cluster" notion, that "builds" the required "damper unit", offers advantages in design and production terms.

According to the invention, the objective is achieved by the use of separate multiple chamber cluster units joined together, so that the resulting co-axial damper can achieve optimal damping and cooling, and offer variable damping characteristics, as defined in independent claim 1. The dependent claims define preferred embodiments of the invention.

In the following, a preferred embodiment of the invention will be discussed in more detail, with reference to the accompanying drawings.

BRIEF DESCRIPTION OF THE DRAWINGS

The invention will be made conceivable with reference to the designs that accompany the present description, in which certain proposed industrial applications of the invention are shown.

FIG. 3 shows a detailed view of the gear drive, the wing and the W-shaped flexible component, inside the chamber.

FIG. 4 depicts the resulting assembly of several chamber clusters, making up the co-axial damper unit of a suspension module.

DESCRIPTION OF PREFERRED EMBODIMENTS

Figure 1:
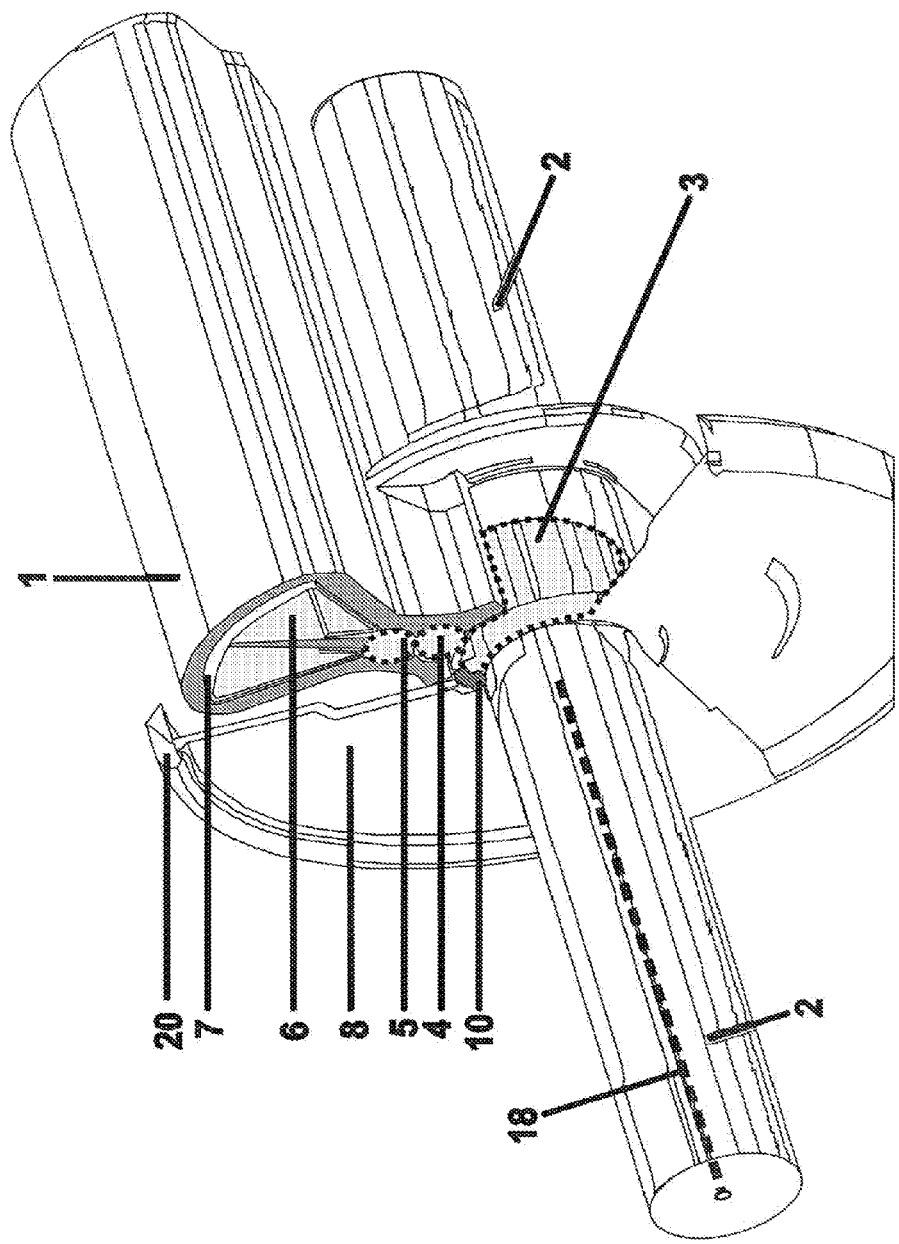
FIG. 1 shows a view of one chamber cluster, its constituent parts, and how it is attached to (the driving) torsion bar, of the suspension module.

FIG. 1-FIG. 4 show a preferred embodiment of the invention. While this particular embodiment will be described in detail below, several modifications will be appreciated by a person skilled in the art, so that the invention shall not be interpreted in a limited manner, referring to the description and the drawings. Rather the invention is defined by the appended claims.

Referring to a selected indicative example of industrial application of the invention, a number of the main sections and components of the device are listed below. More specifically, the basic parts of the invention are the following:
1. Chamber cluster, that encloses one damper wing.
2. Torsion bar (suspension 'spring').
3. Drive gear (fitted onto the torsion bar).
4. Idle gear, (transfering the motion of the drive gear, to the wing gear).
5. Wing gear.
6. Wing.
7. Flexible component (W-shaped wing-enclosure).
8. Assembly cover.
9. Outer gear locator bracket, (holding/controlling parts 4,5,16,17)
10. Outer seals.
11. Inner seals.
12. Inner gear locator bracket, (holding/controlling parts 4,5,16,17)
13. Pressure control valve.
14. Flexible part of the wing.
15. Electromagnetic device that affects the viscosity of the damper fluid via electromagnetic interference with the fulid
16. Axis of rotation of the idle gear.
17. Axis of rotation of the wing gear.
18. Axis of rotation of the torsion bar.
19. Viscous fluid volume space.
20. Assembly bulkhead.

In FIGS. 1-4, reference numeral 1 designated the chamber cluster. The chamber cluster (1), shown in FIGS. 1 and 2, encloses the constituent parts (4), (5), (6), (7) that are connected to the torsion bar (2), via the assembly bulkhead (20).

The rotary motion of the torsion bar (2), (due to the suspension travel), is transmitted via the drive gear (3), to the damping wing (6), via gears (4) and (5).

Gears (4), (5) rotate about axes (16), (17) respectively. Gear (3), rigidly attached to the torsion bar (2), rotates about an axis (18).

According to the preferrred embodiment shown, the chamber cluster (1), shown in FIG. 1, encloses a damping wing (6) that is enclosed in a W-shaped flexible component (7). (FIG. 3)

The rotational motion (FIG. 3), of the damping wing (6), takes place inside the volume space (19). This volume is filled with a viscous fluid, and is formed by the assembly of several chamber clusters around the torsion bar (2), about an axis (18). (FIG. 4, FIG. 1). This assembly is formed using the bulkhead (20).

In FIG. 3, the shape of the W-shaped component (7), is shown in section. This flexible component is closed at the top and open at the lower end, allowing the positioning of the wing (6), inside part (7), occupying the viscous fluid volume (19), within the chamber cluster (1). The rotation of wing (6) creates damping.

Figure 2:
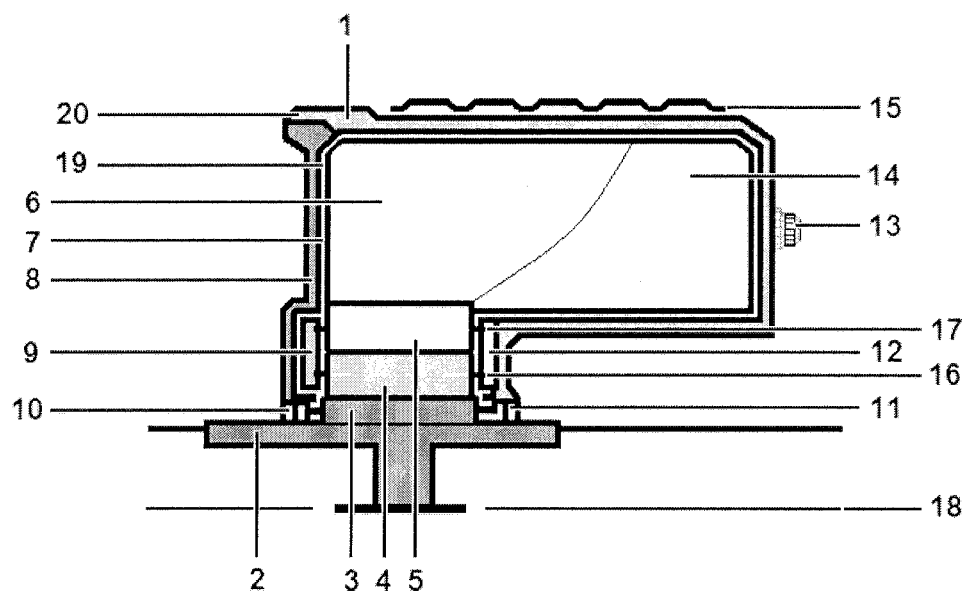
FIG. 2 depicts the constituent parts of the chamber cluster, in section.

The pressure of the fluid in volume (19) is regulated via the valve (13). The viscosity of the fluid can be varied through the electromagnetic device (15), that encloses the chamber cluster (1). FIG. 2. In this case, the viscous fluid becomes a two phase fluid.

Within the chamber cluster (1), the outer gear locator bracket (9) and the inner gear locator bracket (12), position the axes of rotation (16),(17) of gears (4),(5) respectively. The volume (19) is sealed via outer seals (10) and inner seals (11), in sliding contact with the torsion bar (2), which is sealed with the assembly cover (8), and connected to the assembly bulkhead (20). FIG. 2.

The use of the flexible part of the wing (14), attached to wing (6), is associated with the flexible component (7), and the use of a two-phase fluid in volume (19), subject to an electromagnetic device (15), that alters the viscosity of the fluid via electromagnetic interference with the fulid, offering variable damping characteristics to the damper unit and the suspension module.

The resulting assembly (FIG. 4), is formed by the succesive positioning of several chamber cluster (1) units, about the axis (18), and the suspension module torsion bar (2), connected via the bulkhead (20), and the assembly cover (8).

In FIG. 4 a five-chamber-cluster (1) assembly is, indicatively, shown.

A Flexible component having lips to seal the chamber is provided.

The wing includes slots and vortex inducing holes.

What is claimed is:

1. A chamber cluster including one or more chambers for a co-axial damper unit of a suspension module, each chamber of the chamber cluster comprising a damping wing, enclosed in a flexible component, in contact with an inner surface of the chamber cluster, wherein the wing is rotatable in a volume space, formed in a portion of the chamber, that is filled with a viscous fluid, a pressure of the viscous fluid being controlled by a pressure control valve, wherein the wing is driven by motion of a torsion bar of a suspension module that rotates about an axis, the torsion bar being rigidly attached to a first drive gear, which drives the wing via a coupling of an idle gear, and a second drive gear, connected to the wing, wherein the wing is within the volume space, that is sealed by outer seals, and inner seals, sealing the torsion bar, the chamber cluster, a bulkhead and an assembly cover, wherein an outer gear locator bracket, and an inner gear locator bracket orient orienting the axes of rotation of the idle gear and the drive gear, wherein the motion of the wing in the volume space provides damping for the torsion bar the damping being variable, by changing a viscosity of the viscous fluid with an electromagnetic device attached to the chamber, wherein the flexible component has a W-shaped cross-section, with a closed top section and an open lower section, that allows the enclosure of the wing into the flexible component, and allows the partial sealing of the volume space, during rotation of the wing, thus achieving damping.

2. The chamber cluster according to claim 1, wherein the second drive gear is blocked from the fluid of the chamber via the flexible component.

3. The chamber cluster according to claim 1, wherein the flexible component, in which the wing is enclosed, is in contact with a flexible part of the wing, thereby achieving the damping characteristics during the motion of the wing in the volume.

4. The chamber cluster according to claim 1, wherein each of the chambers in the chamber cluster is arranged around the torsion bar, to damp a primary suspension motion of the torsion bar.

5. The chamber cluster according to claim 1, wherein the flexible component has a closed top section that is in contact with the chamber, and an open lower section with lips, that encloses the wing, and follows the motion of the wing, to achieve damping.

6. The chamber cluster according to claim 1, wherein the wing comprises slots and holes to induce damping.

7. The chamber cluster according to claim 6, wherein the wing and flexible part of the wing comprise surfaces defining vortex inducing holes.

8. A vehicle comprising the suspension module with the chamber cluster of claim 1.

* * * * *